United States Patent [19]

Eckstein et al.

[11] 4,080,830
[45] Mar. 28, 1978

[54] PRESSURE TRANSDUCER

[75] Inventors: Paul Eckstein, Erlangen-Tennenlohe; Ottomar Jäntsch, Erlangen; Bernd Reimann, Uttenreuth, all of Germany

[73] Assignee: Siemens Aktiengesellschaft, Munich, Germany

[21] Appl. No.: 788,596

[22] Filed: Apr. 18, 1977

[30] Foreign Application Priority Data

Apr. 23, 1976 Germany .............................. 2617731

[51] Int. Cl.$^2$ ............................................. G01L 9/06
[52] U.S. Cl. ....................................... 73/719; 73/725; 338/4; 338/42
[58] Field of Search .............. 73/398 AR, 406, 407 R; 338/4, 42

[56] References Cited

U.S. PATENT DOCUMENTS 3,762,208  10/1973  Bice et al. ...................... 73/398 AR Primary Examiner—Donald O. Woodiel
Attorney, Agent, or Firm—Kenyon & Kenyon, Reilly, Carr & Chapin

[57] ABSTRACT

A pressure transducer of miniature design with a silicon diaphragm which is provided with a monolithic resistor arrangement, the resistance of which changes with the deformation of the diaphragm in which the diaphragm is arranged between two overload bodies, one of which rests on a support body, whose surfaces facing the diaphragm are each provided with a pressure chamber and pressure canals to obtain an overload-proof pressure transducer which is very small and can be used for measuring large pressure differences.

13 Claims, 2 Drawing Figures

PRESSURE TRANSDUCER

BACKGROUND OF THE INVENTION

This invention relates to a pressure transducer in general and more particularly to an improved pressure transducer of the type with a deformation body of single-crystal semiconductor material, which is provided, in a thin central region serving as a diaphragm, with a resistor arrangement, the resistance change of which is a measure for the pressure.

Pressure transducers of this type in which the resistors therefore serve as strain measuring strips and are provided with electrical contacts are known.

Planar technology can be used for making the resistor arrangement. The wafer-like semiconductor body, the flat side of which is preferably parallel to the (111)-plane of the crystal, is provided with diffused-in electrically conducting regions at its surface which serve as strain measuring strips and can advantageously form four resistors in a bridge circuit. This resistor arrangement can advantageously form a monolithic surface region of the semiconductor body and is provided with electrical contacts. The curvature and thereby, the resistance both change with the pressure. The resistance change changes the voltage at the bridge. (Philips Technische Rundschau 33, 1973/74, no. 1, pages 15 to 22).

SUMMARY OF THE INVENTION

It is an object of the present invention to improve the known pressure transducer of miniature design having a semiconductor diaphragm; in particular, to improve it so that it remains operative even if the pressure to be measured temporarily exceeds a given limit.

In capacitive pressure transducers with a metallic measuring diaphragm and two stationary condenser plates, it is known to design the plates as what are referred to as overload beds. Respective insulator bodies are arranged on both sides of the diaphragm. These have concave recesses to form a pressure chamber which is in communication, via a hole in the insulator body, with a further pressure chamber and against the wall of which the diaphragm rests. As soon as the pressure exceeds a limit, the measuring diaphragm lies against the concave overload bed. In addition, these insulator bodies are each provided with a further feedthrough which has the form of a metallic tube for supplying the pressure medium and which at the same time can serve as an electrical contact lead for the respective condenser plate (German Offenlegungsschrift 2 052 515). For this reason, this instrument is relatively complicated to manufacture. In particular, to construct this known equipment as a miniature pressure transducer, requires considerable effort.

According to the present invention, the above-mentioned problem is solved by the provisions that a thin region of the deformation body containing the diaphragm is surrounded by a reinforced outer zone, and that a first overload take-up is provided which is connected to the thin region and to the outer region of the deformation body and whose surface region facing the diaphragm is provided with a shallow recess serving as a pressure chamber. On the opposite flat side of the deformation body, a second overload take-up is provided which is likewise provided with a shallow pressure chamber for the diaphragm and is connected at least to the thin region of the deformation body. The portions of the surface of the overload take-ups connected to the deformation body are provided with pressure canals and may optionally also contain canals for electrical contact leads for the resistor arrangement. One of the overload take-ups is supported on the outer zone of the deformation body, serving as a support body. The depth of the recesses is chosen in conjunction with the thickness of the deformation body and the diameter of the diaphragm in such a manner that the diaphragm comes to lie against the bottom of the pressure chamber so formed, as soon as the pressure exceeds a predetermined limit. The curvature of the diaphragm is limited to a predetermined value which is still in the range of elastic deformation of the diaphragm. The diaphragm therefore cannot be destroyed if the pressure applied exceeds the limit.

The deformation body, to which the overlead take-ups are connected and whose central region forms the diaphragm, consists at least in part of semiconductor material, preferably silicon and particularly n-conduction silicon of relatively low conductivity. In some cases it may be advantageous to make only part of the deformation body, for instance, only the part which forms the diaphragm or also only a layer of the diaphragm, of semiconductor material, while the rest of the deformation body may consist of different material, e.g., spinel.

Each side of the deformation body is connected to an overload take-up which has the same coefficient of expansion as the semiconductor material of the deformation body. It consists preferably of the same material and is attached to the deformation body in such a manner that its pressure chamber is opposite the surface region of the deformation body serving as the diaphragm. The pressure to be measured is allowed to act on the one flat side of the diaphragm. With increasing pressure, the diaphragm therefore is deflected into the pressure chamber and lies, with increasing curvature, against the bottom of the pressure chamber when the limit of the pressure is reached.

The pressure to be measured can be fed to the pressure chambers via the pressure canals in the surface of the overload bodies by means of a pressure medium. The surfaces of the two overload bodies connected to the deformation body are therefore provided with grooves which act as pressure canals for transmitting the pressure to the pressure chambers.

The resistors at the surface of the diaphragm, serving as strain measuring strips, are provided with electrical contact leads which are likewise brought through such grooves, electrically insulated. The resistors are firmly connected to the diaphragm, so that the curvature of the latter is transmitted to the resistors. They can advantageously be prepared as electrically conducting surface regions of the semiconductor body, preferably in the well known planar technology by diffusion or implantation of doping material.

The outer zone of the deformation body can advantageously be connected to a support body. This design is obtained in a simple manner, for instance, by providing a layer of high-purity, single-crystal semiconductor material of low conductivity on the surface of a flat semiconductor body of high conductivity. This surface layer is preferably prepared by epitaxial deposition. From this semiconductor body, a target-like central region on the opposite flat side is removed to the extent that only the layer of low-conductivity material remains. This removal is advantageously accomplished by thin-etching and in particular, by electrochemical etching.

A central region of this flat semiconductor body serving as the deformation body is then provided with the resistor arrangement. Subsequently, the annular surface region surrounding the central region of the deformation body is permanently connected on at least one flat side to an overload body, preferably by a fused joint, e.g., with a low melting point metal or a metallic compound, but particularly with glass. A cemented joint, for instance, using a silicone varnish, is also suited for this purpose.

DETAILED DESCRIPTION OF THE INVENTION

Figure 1:
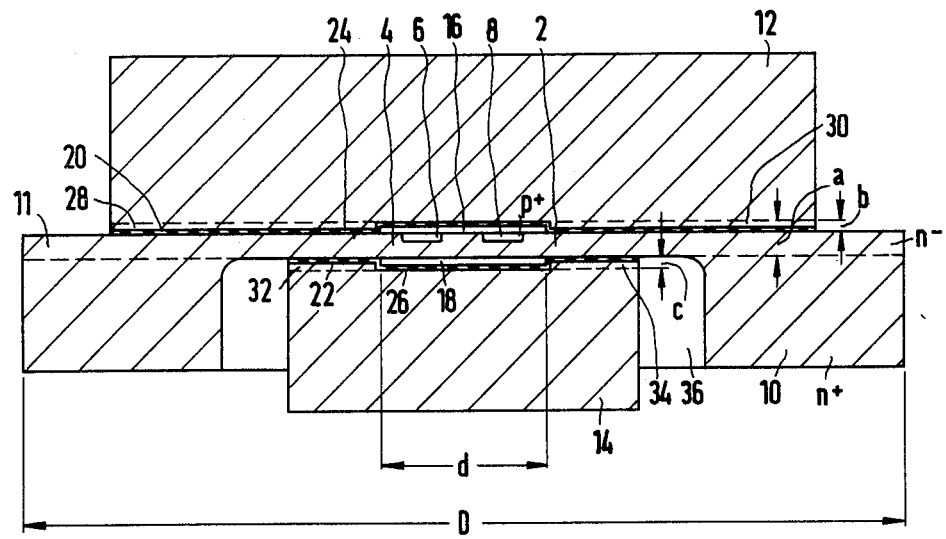
FIG. 1 schematically shows a preferred embodiment of the pressure transducer according to the invention in cross section.

In. FIG. 1 there is shown a deformation body 2 having a central region 4 serving as a diaphragm. Resistors 6 and 8 of a resistor arrangement serving as strain measuring strips are formed in the region 4. Two cylindrical overload take-ups 12 and 14, respectively, are arranged on opposite sides of region 4. The deformation body 2 is the central region of a surface layer 11 of a support body 10. The overload take-ups have different geometrical dimensions and are each provided with a shallow recess, 16 and 18 respectively, serving as a pressure chamber on one of their flat sides. The connection of the deformation body 2 and the support body 10 with the overload bodies 12 and 14 is established by respective intermediate layers 20 and 22. These intermediate layers may also form linings 24 and 26, respectively, in the pressure chambers 16 and 18, against which the diaphragm 4 can lie in the event of an elastic deformation by the pressure to be measured. This lining 24, at least, can therefore preferably consist of electrically insulating material which then at the same time acts as electrical insulation for the resistor arrangement 6 and 8 when the diaphragm 4 rests against the overload body 12. The overload bodies 12 and 14 are each provided with pressure canals 28, 30 and 32, 34, respectively, which consist of grooves with a depth of, for instance, about 5 $\mu$m, so that, with a thickness of the connecting layers 20 and 22 of preferably less than 3 $\mu$m, and in particular, about 1 $\mu$m and less, the total depths $b$ and $c$ of the grooves 28, 30 and 32, 34 is not substantially more than 6 $\mu$m. The diameter $d$ of the diaphragm should be, for instance, about 1000 $\mu$m and the width D of the support body 10 about 5000 $\mu$m. In conjunction with a diaphragm thickness $a$ of, say, about 10 to 20 $\mu$m and in particular, about 15 $\mu$m, the depth of the pressure chambers is chosen as about 5 $\mu$m. Then, the ratio of the deflection of the diaphragm 4 to its extent is about 1:200 at the maximally permissible pressure load and therefore, the maximum deflection of the diaphragm. With this curvature, the elastic range of the semiconductor body is not exceeded. Thus, a permanent deformation of the diaphragm 4 is avoided even if the pressure transducer is overloaded, i.e., if the pressure exceeds the still measurable limit.

The overload take-ups 12 and 14 consist of a material with at least approximately the same coefficient of expansion and preferably of the same material as the deformation body 2. Thus with a deformation body 2 of n-conduction silicon, they likewise should be of silicon. The dimensions of the overload take-ups 12 and 14 in the direction of the flat sides of the deformation body 2 and their thickness perpendicular to this direction are chosen so that they are practically not deformed in the pressure range for which the pressure transducer is designed. Substantially higher stiffness is obtained by different geometrical dimensions of the overload take-ups 12 and 14. The diameter of the one overload body, for instance, of the upper one 12, is preferably chosen substantially larger than the diameter of the other one. The diameter of the overload body 12, in particular, can be chosen large enough that it is still at least supported on a rim region of the support body 10. For a range of differential pressure to be measured of, for instance, 20 $\times$ 10$^{-3}$ bar to 20 bar, at which a unilateral overload of, for instance, between 1 and 500 bar can occur, the thickness of the upper overload body 12 is chosen to be, for instance, 450 $\mu$m and the thickness of the lower overload body 14 chosen to be, for instance, 400 $\mu$m. The surfaces of the overload bodies 12 and 14 facing the deformation body are planar.

The connection of the overload take-ups 12 and 14 to the deformation body 2 and the support body 10 is accomplished by means of the intermediate layers 20 and 22, the material of which must be particularly thin and uniformly applicable. The thickness of layers 20 and 22 is preferably not substantially more than 1 $\mu$m and must be uniform over the entire surface to be connected. The material of the intermediate layer must furthermore be very hard and at the same time mechanically stable and adhere well to the surfaces to be connected. Therefore, a fused connection is preferably made with a material having a relatively low melting point. Glass meets these requirements. The melting point of the glass is lower than 575° C, so that at this temperature no reaction of the metallic contact leads of the resistor arrangement with the silicon of the deformation body can yet take place. The thermal expansion coefficients of glass and silicon are approximately equal. Glass is furthermore chemically passive with respect to the contact leads of the resistor arrangement.

In addition to a glass layer, a fused connection which consists at least partly of metal, e.g., a gold-silicon eutectic is also suitable. In addition, special adhesives, for instance, silicone varnish may also be used.

After the permanent connection is made, the pressure transducer is built into a suitable housing and the electrical contact leads of the resistor arrangement are connected to the external leads, for instance, by ultrasonic welding.

Figure 2:
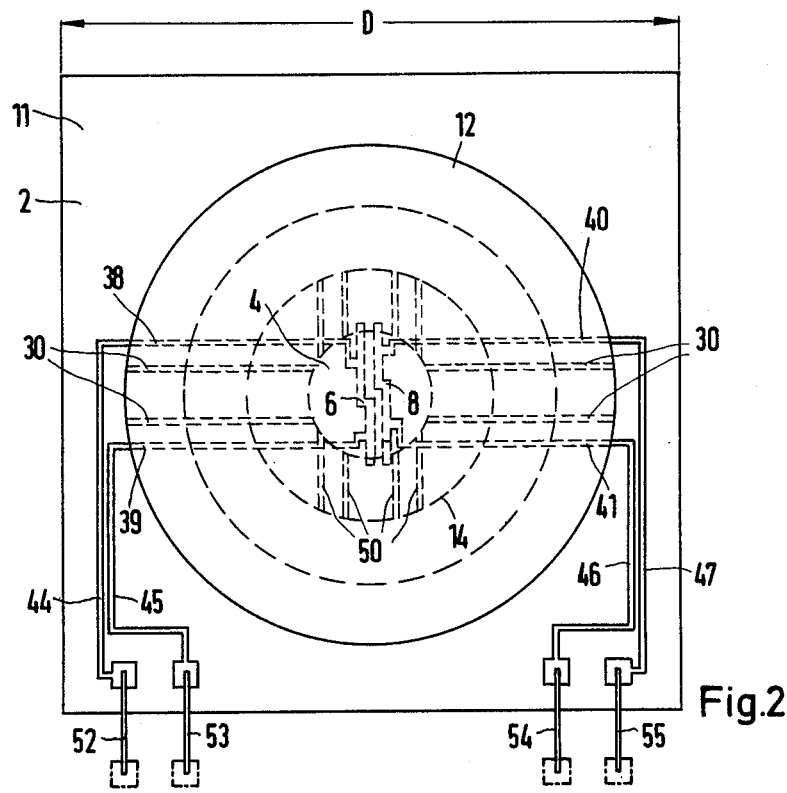
FIG. 2 shows the transducer of FIG. 1 in top view.

From the top view of FIG. 2, the arrangement of the overload body 12 which covers up the deformation body 2 in the area of the diaphragm 4 can be seen. On its underside, the overload body 12 is provided with the pressure canals 28 and 30 as well as with canals 38 and 41 for the electrical contact leads 44 to 47. The diaphragm 4 is provided with a resistor arrangement, which is only indicated as a particularly simple arrangement of resistors in a bridge circuit showing resistors 6 and 8 which are depicted in the cross-section on FIG. 1. The lower overload body 14 is likewise provided with pressure canals 50, the direction of which is rotated 90° relative to the pressure canals 32 and 34 indicated in FIG. 1. The support body 10 with its surface layer 11, the middle part of which forms the deformation body 2, has a rectangular shape, while the deformation body 2 and the overload bodies 12 and 14 are disk shaped. The contact leads 44 to 47 are connected to external electrical leads, 52 to 55 respectively.

A particularly advantageous design of the resistor arrangement at the surface of the diaphragm 4 consists of a monolithic arrangement of four individual resistors which are arranged so that two resistors connected opposite each other in a bridge circuit are divided up into several individual resistors which run in the radial direction of the diaphragm. These resistors cover the outer surface area of the diaphragm 4. On the other hand, the two other resistors, which are likewise connected opposite each other in the bridge circuit, are arranged so that they cover the inner surface area of the diaphragm 4. They are likewise subdivided into individual resistors, which except for the connecting sections of the subresistors, each run in the azimuthal direction and form concentric portions of a ring.

In one preferred manner of manufacturing the pressure transducer, the electrical contact leads of the resistors are made simultaneously with the placing of the monolithic resistor arrangement into the surface of the diaphragm 4, for instance, by diffusion, in the same manner and preferably in the same operation. This embodiment of the pressure transducer has the advantage that special lead-in canals are not necessary for these electrical contact leads.

What is claimed is:

1. In a pressure transducer with a deformation body of single-crystal semiconductor material which is provided, in a thin central region serving as a diaphragm, with a resistor arrangement thereon, the resistance change of which is a measure for the pressure, the improvement comprising:
   (a) a reinforced outer region surrounding the thin region of the deformation body containing the diaphragm;
   (b) a first overload take-up connected to the thin region and to the outer region of the deformation body having a surface region facing the diaphragm containing a shallow cylindrical recess serving as a pressure chamber and an overload bed;
   (c) a second overload take-up disposed on the opposite flat side of the deformation body likewise containing a shallow cylindrical recess and connected to the thin region of the deformation body; and
   (d) pressure canals in the portions of the surface of the overload bodies connected to the deformation body.

2. The improvement according to claim 1 wherein said deformation body is made of a single-crystal semiconductor material having a thin central region serving as a diaphragm with a resistor arrangement thereon, the resistance change of which is a measure for the pressure, and wherein the improvement further comprises one of the overload take-ups having a dimension parallel to the diaphragm which is substantially larger than the corresponding dimension of the other one.

3. The improvement according to claim 2 wherein the said diaphragm is made of silicon and has a thickness of between about 10 to 20 $\mu$m and a diameter of about 1000 $\mu$m and wherein the depth of the pressure chamber of each of said overload take-ups is about 5 $\mu$m.

4. The improvement according to claim 3 wherein a fused connection is provided between said deformation body and said first and second overload take-ups.

5. The improvement according to claim 4, said fused connection comprises a glass layer.

6. The improvement according to claim 5, wherein the thickness of said glass layer is less than 3 $\mu$m.

7. The improvement according to claim 6 wherein the thickness of said glass layer is about 1 $\mu$m.

8. The improvement according to claim 4, wherein said pressure chambers are lined with a glass layer acting as electrical insulation.

9. The improvement according to claim 4, wherein said fused connection consists at least in part of metal.

10. The improvement according to claim 9, wherein said fused connection consists of a gold-silicon eutectic.

11. The improvement according to claim 1, wherein said deformation body and said overload take-ups consist of silicon.

12. The improvement according to claim 1, wherein said resistor arrangement comprises a monolithic resistor arrangement of single-crystal semiconductor material in a bridge circuit and wherein electrical contact leads for said bridge circuit are included and form part of the monolithic embodiment.

13. The improvement according to claim 12, wherein said diaphragm consists of n-conduction silicon with a resistivity of at least 10 ohm cm and wherein said resistor arrangement is a p-conduction resistor arrangement.

* * * * *